United States Patent

[11] 3,617,245

| [72] | Inventors | Seiichi Ishida<br>Saitama;<br>Yasuo Kamuro, Saitama; Tadayoshi<br>Takano, Hirakata; Takashi Iwata, Kyoto,<br>all of Japan |
|---|---|---|
| [21] | Appl. No. | 625,983 |
| [22] | Filed | Mar. 27, 1967 |
| [45] | Patented | Nov. 2, 1971 |
| [73] | Assignees | Fujisawa Pharmaceutical Co., Ltd.<br>Osakafu, Japan;<br>Nissan Chemical Industries Co., Ltd.<br>Tokyo-to, Japan |
| [32] | Priority | Apr. 7, 1966 |
| [33] | | Japan |
| [31] | | 41/21454 |

[54] COMPOSITIONS AND METHODS FOR CONTROLLING PLANT GROWTH
4 Claims, No Drawings

[52] U.S. Cl. .................................................. 71/76, 71/109, 71/116
[51] Int. Cl. ...................................................... A01n 9/24, A01n
[50] Field of Search ........................................... 71/109, 116, 76

[56] References Cited
OTHER REFERENCES

Thompson et al. " Botanical Gazette," Vol. 107, pages 476– 507 (1946)

*Primary Examiner*—James O. Thomas, Jr.
*Attorney*—Wenderoth, Lind & Ponack

ABSTRACT: Compositions and methods for controlling the growth in height of Gramineae plants selectively without producing any metamorphosis in the leaves which employ as the active ingredient m-trifluoromethylphenoxyacetic acid or its salt or ester.

COMPOSITIONS AND METHODS FOR CONTROLLING PLANT GROWTH

The present invention relates to compositions and methods for controlling plant growth. More particularly, it relates to compositions and methods for controlling the growth in height of Gramineae plants.

In this specification, the term "Gramineae plants" is intended to mean not only crop plants but also wild plants, inclusively. For designating the latter only, the term "Gramineae grasses" is used.

There have heretofore been known a number of compounds useful as plant growth regulators. However, none of them can control effectively the growth in height of Gramineae plants resulting in no undesirable influence.

In the course of the study seeking the growth regulators which are satisfactorily applied to Gramineae plants, it has been found that m-trifluoromethylphenoxyacetic acid and its salts and esters (hereinafter referred to as "m-trifluoromethylphenoxyacetic acid compounds") are effective in controlling the growth in height of the plants without producing substantially metamorphosis in the leaves, even when applied in relatively high concentrations. It has also been found that such favorable effect of the m-trifluoromethylphenoxyacetic acid compounds is exhibited selectively in Gramineae plants such as rice plant (*Oryza sativa*), wheat (*Triticum sativum*), barley (*Hordeum sativum*), rye (*Secale cereale*), millet (*Panicum miliaceum*), barnyard grass (*Echinochola crus-galli*), timothy (*Phleum pratense*) and weeping love grass (*Eragrostis curvula*), Prior to these findings, it was reported that m-trifluoromethylphenoxyacetic acid is active in the Avena cylinder straight growth test [Hansch et al.: J. Am. Chem. Soc., 85, 2817 (1963)]. However, the practical utilizability of the compound as a plant growth regulator has been unobvious, because the growth regulator of this kind is required to exert the control effect on certain parts of plants at definite growth stage without affording any unfavorable influence on the entire growth but such certainty and definitiveness were not disclosed in the said and any other literatures.

Some experimental results which support the said findings are set forth below.

EXPERIMENT 1 m-Trifluoromethylphenoxyacetic acid (one part by weight) was dissolved in ethanol (five parts by weight), admixed with a wetting agent "NITTEN" [a waste liquor of pulp containing 15 percent by weight of polyoxyethylene alkyl ethers, 20 percent by weight of higher alcohols and 30 percent by weight of lignin sulfonates manufactured by Nissan Chemical Industries Co., Ltd.] in such amounts that the concentration after the subsequent dilution with water is 200 p.p.m. and diluted with suitable amounts of water to make designated concentrations of the active ingredient. Also, sodium 2,4-dichlorophenoxyacetate (hereinafter referred to as "2,4-D Na" as a comparative compound was dissolved in hot water, admixed with the said wetting agent in such amounts as mentioned above and diluted with suitable amounts of water to make designated concentrations of the active ingredient.

Into each of unglazed pots of 12 cm. in diameter accommodating diluvial soil, there were sown 5 seeds of barnyard grass, and cultivation was carried out in a greenhouse. When the plants reached the three leaf stage, the test solution as prepared above was applied by spraying on the foliage of the plants in a rate of 5 ml. per pot. The test was duplicated.

Three weeks after the application, the average height of the treated plants, its rate to the average height of the untreated plants and the extent of metamorphosis in the leaves were determined. The results are shown in table 1.

TABLE 1

| Test plot | | | | |
|---|---|---|---|---|
| Test compound | Concentration (p.p.m.) | Average height of plants (cm.) | Rate [1] | Extent of metamorphosis in leaves |
| m-Trifluoromethyl-phenoxyacetic acid | 250 | 24.4 | 75.1 | None. |
| | 500 | 22.6 | 69.5 | Do. |
| | 1,000 | 20.5 | 63.1 | Do. |
| | 2,000 | 16.0 | 49.2 | Do. |
| | 250 | 28.5 | 87.7 | Do. |
| | 500 | 25.0 | 76.9 | Slight. |
| | 1,000 | 18.6 | 57.2 | Medium. |
| | 2,000 | 5.7 | 17.5 | Severe. |
| Untreated | | 32.5 | 100 | None. |

[1] Average height of treated plants to that of untreated plants (percent).

From the above table, it is recognized that m-trifluoromethylphenoxyacetic acid can control the growth in height of barnyard grass without producing any metamorphosis at the concentrations effective in controlling the growth.

EXPERIMENT 2

The test was carried out as in experiment 1 but using rice plant in place of barnyard grass. The results are shown in Table 2.

TABLE 2

| Test plot | | | | |
|---|---|---|---|---|
| Test compound | Concentration (p.p.m.) | Average height of plants (cm.) | Rate [1] | Extent of metamorphosis in leaves |
| m-Trifluoromethyl-phenoxyacetic acid | 250 | 19.2 | 87.3 | None. |
| | 500 | 15.6 | 70.9 | Do. |
| | 1,000 | 14.0 | 63.6 | Do. |
| | 2,000 | 12.8 | 58.2 | Do. |
| | 250 | 20.9 | 95.0 | Do. |
| | 500 | 18.3 | 83.1 | Do. |
| | 1,000 | 16.5 | 75.0 | Do. |
| | 2,000 | 14.7 | 66.8 | Slight. |
| Untreated | | 22.0 | 100 | None. |

[1] See footnote Table 1.

From the above table, it is recognized that m-trifluoromethylphenoxyacetic acid can control the growth in height of rice plant without producing any metamorphosis in the leaves.

EXPERIMENT 3

Designated concentrations of test solutions of m-trifluoromethylphenoxyacetic acid and 2,4-D Na were prepared as in experiment 1.

Into each of wooden boxes of 30 cm. in length, 30 cm. in width and 8 cm. in height accommodating field soil, there were sown 50 seeds of Italian ryegrass, and cultivation was carried out in a greenhouse. When the plants reached the eight to 10 leaf stage 50 days after the sowing, the test solution was applied by spraying in a rate of 30 ml. per box. The cultivation was then continued in the greenhouse. When the plants reached the fruiting stage and the growth in height ceased, the entire length of the stem and each of four internode lengths from the extreme top of the stem to the fourth node were determined. The results are shown in table 3.

EXPERIMENT 5

According to per se conventional procedures, there were prepared test compositions containing as the active ingredient one of m-trifluoromethylphenoxyacetic acid and its salts and esters as listed in table 5.

TABLE 3

| Test plot | | Internode length (cm.) | | | | Stem length (cm.) |
|---|---|---|---|---|---|---|
| Test compound | Concentration (p.p.m.) | First | Second | Third | Fourth | |
| m-Trifluoromethylphenoxyacetic acid | 500 | 23.6 (96.7) | 9.0 (88.2) | 6.9 (88.5) | 3.3 (86.8) | 42.8 (92.6) |
| | 1,000 | 19.9 (81.6) | 8.3 (81.4) | 6.0 (76.9) | 3.2 (84.2) | 37.4 (81.0) |
| | 1,500 | 17.9 (73.4) | 6.9 (67.6) | 4.9 (62.8) | 3.1 (81.6) | 32.9 (71.2) |
| 2,4-D Na | 500 | 24.3 (99.6) | 9.8 (96.1) | 8.8 (112.8) | 4.8 (126.3) | 47.7 (103.2) |
| | 1,000 | 21.4 (87.7) | 8.5 (83.3) | 7.9 (101.3) | 4.0 (105.3) | 41.8 (90.5) |
| | 1,500 | 18.9 (77.5) | 8.4 (82.4) | 6.4 (82.1) | 4.2 (110.5) | 37.9 (82.0) |
| Untreated | | 24.4 (100) | 10.2 (100) | 7.8 (100) | 3.8 (100) | 46.2 (100) |

NOTE.—The numerals in parentheses indicate the rate (percentage) of the height of the treated plants to that of the untreated plants.

From the above table, it is seen that m-trifluoromethylphenoxyacetic acid controls the growth in length of the stem of Italian ryegrass, particularly at the lower internodes, better than 2,4-D Na.

EXPERIMENT 4.

Designated concentrations of test solutions of m-trifluoromethylphenoxyacetic acid and 2,4-D Na were prepared as in experiment 1.

Into each of unglazed pots of 15 cm. in diameter accommodating diluvial soil, there were sown three seeds of barley at each of three places. After germination, thinning was carried out so as to leave only one plant at each place, i.e. three plants in each pot, those being of a nearly equal height. Then, cultivation was carried out in an unwarmed greenhouse under a short-day condition. Two months after the sowing, the grown plants were taken out and placed in a warmed greenhouse of a long-day condition. When the plants reached the primary stage of ear formation, the test solution was applied by spraying on the foliage of the plants at a rate of 7.5 ml. per pot. The test was duplicated.

One month after the application, the entire length of the stem and each of three internode lengths from the extreme top of the stem to the third node were determined. The results are shown in table 4.

TABLE 5

| Test compound | Preparation form of test composition | Content of test compound [1] |
|---|---|---|
| m-Trifluoromethylphenoxyacetic acid. | Isopropanol solution | 20 |
| Sodium m-trifluoromethylphenoxyacetate. | Soluble powder | 90 |
| Dimethylammonium m-trifluoromethylphenoxyacetate. | Aqueous solution | 20 |
| Triethanolammonium m-trifluoromethylphenoxyacetate. | Dust | 1 |
| Ethyl m-trifluoromethylphenoxyacetate. | Wettable powder | 25 |

[1] As calculated in terms of acid (percent).

The test composition was diluted with water so as to make 1,000 p.p.m. concentration (as calculated in terms of acid) of the active ingredient and applied by spraying on barnyard grass cultivated as in experiment 1 at a rate of 5 ml. per pot or, in case of dust, in such an amount that the quantity (as calculated in terms of acid) of the active ingredient per unit area is equal.

As the result, it was confirmed that these test compounds

TABLE 4

| Test plot | | Internode length (cm.) | | | Stem length (cm.) |
|---|---|---|---|---|---|
| Test compound | Concentration (p.p.m.) | First | Second | Third | |
| m-Trifluoromethylphenoxyacetic acid | 700 | 7.8(7) | 8.0(75)2.4(5.) | 0.0(67)2.0(56)2.1(59) | 13.5(65)15.0 |
| | 1,000 | | | | (72) |
| 2,4-D Na | 700 | 9.6(90)10.1 | 4.4(98)3.5(78) | 3.9(108)2.2 | 19.8(95)17.1 |
| | 1,000 | (94) | | (60) | (82) |
| Untreated | | 10.7(100) | 4.5(100) | 3.6(100) | 20.8(100) |

NOTE.—The numerals in parentheses indicate the rate (percentage) of the height of the treated plants to that of the untreated plants. The first internode length and the entire length of the stem do not include the length of the ear.

From the above table, it is clear that m-trifluoromethylphenoxyacetic acid controls significantly the growth in height of barley.

equally exert the control effect of the growth in height of barnyard grass without producing any metamorphosis in the leaves.

EXPERIMENT 6

TABLE 6

| Test compound | Concentration (p.p.m.) | Average height of plants (cm.) | Rate[1] | Extent of entire growth at final (leaf stage) |
|---|---|---|---|---|
| m-Trifluoromethylphenoxyacetic acid | 50 | 36.6 | 92 | 5.5 |
| | 100 | 34.0 | 85 | 5.5 |
| | 200 | 31.1 | 78 | 5.3 |
| | 300 | 30.2 | 76 | 5.3 |
| | 500 | 29.1 | 73 | 5.0 |
| Ethyl m-trifluoromethylphenoxyacetate | 50 | 38.1 | 96 | 5.5 |
| | 100 | 34.6 | 87 | 5.5 |
| | 200 | 33.7 | 85 | 5.5 |
| | 300 | 30.7 | 77 | 5.5 |
| | 500 | 29.1 | 73 | 5.0 |
| Allyl m-trifluoromethylphenoxyacetate | 50 | 37.1 | 93 | 5.5 |
| | 100 | 32.7 | 84 | 5.5 |
| | 200 | 31.5 | 79 | 5.5 |
| | 300 | 29.4 | 74 | 5.3 |
| | 500 | 28.6 | 72 | 5.0 |
| 2,4-D Na | 50 | 39.9 | 100 | 5.5 |
| | 100 | 37.9 | 95 | 5.5 |
| | 200 | 33.2 | 83 | 5.3 |
| | 300 | 32.1 | 80 | 5.0 |
| | 500 | 27.5 | 69 | 4.3 |
| Untreated | | 37.9 | 100 | 5.5 |

[1] Average height of plants in treated plot to that in untreated plot (percent).

In the above table, no significant difference in the control effect is seen among the tested three m-trifluoromethylphenoxyacetic acid compounds. While their effect for controlling the growth in height of rice plant is marked at concentrations higher than 30 p.p.m. their producibility of metamorphosis is low in comparison with 2,4-D Na. Thus, the range of their effective concentrations without affording any unfavorable influence is relatively wide and their effect is stable.

EXPERIMENT 7

As in experiment 1, test solutions containing m-trifluoromethylphenoxyacetic acid in 200 and 1,000 p.p.m. concentrations were prepared. In each of pots of 15 cm. in diameter, there was sown a seed of cucumber (Cucumis sativus). When the plants reached the one leaf stage, the test solution was applied by spraying at a rate of 5 ml. per pot.

As the result, it was recognized that the plants received the 1,000 p.p.m. test solution were much influenced to form distortions of the leaves. In the plants received the 200 p.p.m. test solution, unfavorable influence was not apparently found. Although slight regulation of the growth (i.e. 41.1 cm. in height of the treated plants to 45.5 cm. in height of the untreated plants) was once produced, it disappeared soon and the height of the treated plants became nearly equal to that of the untreated plants.

In the same experiment as above but using raddish (Raphanus sativus) in place of cucumber, most of the plants received the 1,000 p.p.m. test solution were dead and those received the 200 p.p.m. test solution were not controlled in height.

Summarizing these and other experimental results, it is concluded that the m-trifluoromethylphenoxyacetic acid compounds are highly effective in controlling the growth in height of Gramineae plants, particularly the elongation of the lower internodes, without producing substantially any metamorphosis in the leaves. Thus, the practical use of the m-trifluoromethylphenoxyacetic acid compounds as plant growth regulators of Gramineae plants, e.g. for protecting them for lodging, is now embodied.

In this connection, it may be noted that 2,4-dichlorophenoxyacetic acid (hereinafter referred to as "2,4-D") was used as a growth regulator for Gramineae plants. However, this compound exhibits considerable metamorphosis activity so that the leaves are occasionally withered or rolled and the crop is decreased. Therefore, the application amount and the application period are extremely limited. The m-trifluoromethylphenoxyacetic acid compounds are much more advantageous than 2,4-D in the utilizability with high safety.

A basic object of the present invention is to provide a composition for controlling the growth in height of Gramineae plants without producing substantially any metamorphosis in the leaves. Another object of this invention is to provide a composition for protecting Gramineae plants from lodging. Another object of the invention is to provide a method for controlling the growth in height of Gramineae plants without producing substantially any metamorphosis in the leaves. A further object of the invention is to provide a method for protecting Gramineae plants from lodging. These and other objects will be apparent to those conversant with the art to which the present invention pertains from the above and subsequent descriptions.

The composition of the present invention comprises as the active ingredient at least one of the m-trifluoromethylphenoxyacetic acid compounds which include, for instance, those represented by the general formula:

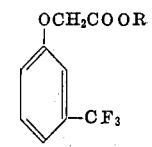

wherein R is a hydrogen atom, an alkali metal atom (e.g. sodium, potassium), an ammonium group, a mono(lower) alkylammonium group (e.g. methylammonium, ethylammonium, propylammonium, isopropylammonium, butylammonium), a di(lower) alkylammonium group (e.g. dimethylammonium, diethylammonium, methylethylammonium, dipropylammonium, diisopropylammonium, dibutylammonium), a tri(lower)alkylammonium group (e.g. trimethylammonium, triethylammonium, tripropylammonium, tributylammonium), a mono(lower) alkanolammonium group (e.g. ethanolammonium, propanolammonium, butanolammonium), a di(lower) alkanolammonium group (e.g. diethanolammonium, dipropylammonium, diisopropylammonium), a tri(lower) alkanolammonium group (e.g. trimethanolammonium, triethanolammonium, tripropanolammonium), a lower alkyl group (e.g. methyl, ethyl, propyl, isopropyl, butyl) or a lower alkenyl group (e.g. allyl).

Specific examples of the m-trifluoromethylphenoxyacetic acid compounds are: m-trifluoromethylphenoxyacetic acid, sodium m-trifluoromethylphenoxyacetate, potassium m-trifluoromethylphenoxyacetate, ammonium m-trifluoromethylphenoxyacetic methylammonium m-trifluoromethylphenoxyacetate, ethylammonium m-trifluoromethylphenoxyacetate, propylammonium m-trifluoromethylphenoxyacetate, isopropylammonium m-trifluoromethylphenoxyacetate, butylammonium m-trifluoromethylphenoxyacetate, dimethylammonium m-trifluoromethylphenoxyacetate, diethylammonium m-trifluoromethylphenoxyacetate, dipropylammonium m-trifluoromethylphenoxyacetate, diisopropylammonium m-trifluoromethylphenoxyacetate, dibutylammonium m-trifluoromethylphenoxyacetate, trimethylammonium m-trifluoromethylphenoxyacetate, triethylammonium m-trifluoromethylphenoxyacetate, tripropylammonium m-trifluoromethylphenoxyacetate, tripropylammonium m-trifluoromethylphenoxyacetate, tributylammonium m-trifluoromethylphenoxyacetate, ethanolammonium m-trifluoromethylphenoxyacetate, propanolammonium m-trifluoromethylphenoxyacetate, butanolammonium m-trifluoromethylphenoxyacetate, diethanolammonium m-trifluoromethylphenoxyacetate, dipropanolammonium m-trifluoromethylphenoxyacetate, dibutanolammonium m-trifluoromethylphenoxyacetate, trimethanolammonium m-trifluoromethylphenoxyacetate, triethanolammonium m-trifluromethylphenoxyacetate, tripropanolammonium m-trifluoromethylphenoxyacetate, triisopropanolammonium m- trifluoromethylphenoxyacetate, tributanolammonium m-trifluoromethylphenoxyacetate, methyl m-trifluoromethylphenoxyacetate, ethyl m-trifluoromethylphenoxyacetate, propyl m-trifluoromethylphenoxyacetate, isopropyl m-trifluoromethylphenoxyacetate, butyl m-trifluoromethylphenoxyacetate, allyl m-trifluoromethylphenoxyacetate, etc.

The preparation form of the composition may be any conventional one.

Solid preparations can be prepared with inert powders. The preparations thus can be homogeneous powders that either can be used as such, diluted with inert solids to form dusts, or suspended in a suitable liquid medium for spray application. The powders usually comprise the active ingredient admixed with suitable amounts of conditioning agents. Natural clays, either absorptive such as attapulgite or relatively nonabsorptive such as china clays, diatomaceous earth, walnut shell flour, redwood flour, synthetic fine silica, calcium silicate and other inert solid carriers can be used. The active ingredient usually makes up from about 1 to about 80 percent by weight, preferably from about 10 to about 50 percent by weight, of these powder preparations. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

Liquid preparations including the active ingredient can be prepared by admixing the same with a suitable liquid medium. The active ingredient can be either in solution or in suspension in the liquid medium. Typical of the liquid media commonly employed are kerosene, Stoddard solvent, xylene, alcohols, alkylated naphthalene, glycols and ketones such as diisobutyl-ketone, cyclohexanone, etc. The active ingredient usually makes up from about 1 to about 80 percent by weight, preferably from about 10 to about 50 percent by weight, of these liquid preparations. Some of these preparations are designed to be used as such, and other to be extended with large quantities of water.

Preparations in the form of wettable powders or liquids can also include one or more surface active agents such as wetting, dispersing or emulsifying agents. Thus mixtures of the above liquids with the active ingredient can contain an emulsifying agent to make an emulsifiable oil preparation. The surface active agents cause the compositions of the liquid or dry to disperse or emulsify easily in water to give aqueous sprays. The surface active agents employed can be of the anionic, cationic and/or nonionic type.

Anionic surface active agents that may be used are those having either one of the following general formula: R—COOM, R—SO$_3$M and R—OSO$_3$M wherein M is an alkali metal atom, an ammonium group or a substituted ammonium group and R is an organic radical containing at least one group having more than eight carbon atoms. Examples of such anionic surface active agents are: (1) soaps of fatty and/or rosin acids, including dehydrogenated, hydrogenated and disproportionated rosin soaps (e.g. sodium laurate, ammonium stearate, diethanolammonium oleate, sodium salt of disproportionated rosin acid); (2) alkyl sulfonates (e.g. dodecyl sodium sulfonate, cetyl potassium sulfonate); (3) alkyl sulfates (e.g. sodium dodecyl sulfate, sodium oleyl sulfate); (4) sulfonated ethers of long and short chain aliphatic groups (e.g. C$_{17}$H$_{33}$—O—C$_2$H$_4$—SO$_3$Na); (5) sulfated ethers of long and short chain aliphatic groups (e.g. C$_{17}$H$_{33}$—O—C$_2$H$_4$—O—SO$_3$Na); (6) sulfonated alkyl esters of long chain fatty acids (e.g. C$_{17}$H$_{33}$—CO—O—C$_2$H$_4$—SO$_3$Na); (7) sulfated alkyl esters of long chain fatty acids (e.g. C$_{17}$H$_{33}$—CO—O—C$_2$H$_4$—O—SO$_3$Na); (8) sulfonated alkyl substituted amides of long chain fatty acids (e.g. C$_{17}$H$_{33}$—CO—NH—C$_2$H$_4$—SO$_3$Na, C$_{17}$H$_{33}$co-n,ch$_3$)—C$_2$H$_4$—SO$_3$Na); (9) alkylated aryl sulfonates (e.g. isopropyl naphthalene sodium sulfonate, dodecyl benzene sodium sulfonate); (10) hydroaromatic sulfonates (e.g. tetra-hydro-naphthalene sodium sulfonate); (11) alkyl sulfosuccinates (e.g. dioctyl sodium sulfosuccinate); (12) aryl sulfonate-formaldehyde condensation products (e.g. condensation product of formaldehyde and sodium naphthalene sulfonate).

Nonionic surface active agents that may be used are: (1) monoethers of polyglycols with long chain fatty alcohols such as reaction products of ethylene oxide or polyethylene glycol with a long chain fatty alcohol (e.g. reaction product of ethylene oxide and oleyl alcohol); (2) monoesters of polyglycols with long chain fatty acids such as reaction products of ethylene oxide or polyethylene glycol with a long chain fatty acid (e.g. reaction product of ethylene oxide or polyethylene glycol with oleic acid); (3) monoethers of polyglycols with alkylated phenols such as reaction products of ethylene oxide or polyethylene glycol with an alkyl phenol (e.g. reaction product of ethylene oxide and isopropyl phenol); (4) polyoxyethylene-polyoxypropylene glycols made by condensing ethylene oxide with hydrophobic base formed by the condensation of propylene oxide with propylene glycol (e.g. H(OC$_3$H$_6$)$_m$(OC$_2$H$_4$)$_n$OH wherein the molecular weight of (OC$_3$H$_6$)$_m$ is 800 to 2,500 and (OC$_2$H$_4$)$_n$ is 10 to 90 percent by weight of the molecule, such as H(OC$_3$H$_6$)$_{25-30}$(OC$_2$H$_4$)$_{8-12}$OH); (5) partial esters of polyhydric alcohols with long chain monocarboxylic (fatty and/or rosin) acids (e.g. glycerol monostearate, sorbitan trioleate); (6) partial and complete esters of long chain monocarboxylic (fatty and/or rosin) acids with polyglycol ethers of polyhydric alcohols (e.g. polyoxyethylene sorbitan tristearate, polyoxyethylene sorbitol hexaoleate).

Cationic surface active agents that may be used are: (1) quaternary ammonium salts in which one of the radicals attached to the nitrogen has an organic group containing at least eight carbon atoms (e.g. trimethyl cetyl ammonium iodide, lauryl pyridinium chloride, cetyl dimethyl benzyl ammonium chloride, N-stearyl betaine); (2) amines, amides and diamines having an organic group containing at least eight carbon atoms, and their acid salts (e.g. stearyl amine hydrochloride, oleyl amide, diethylethylene oleyl diamine).

The composition of the present invention may be applied in a variety of modes, of which typical examples are as follows:

A. On farming lands:

Rice plants receive the foliage spray of the composition in a rate of 100 to 1,000 g. of the active ingredient per hectare at the stage just before panicle differentiation and stem elongation so that the plants are protected from lodging.

B. On nonfarming lands (e.g. embankments, roads, playgrounds):

Gramineae grasses receive the repeated foliage spray of the composition in a rate of 100 to 1,000 g. of the active ingredient per hectare at the rapid growing stage so that the growth in height of the grasses is controlled.

Some practical embodiments of this invention are illustratively shown in the following examples.

EXAMPLE 1 m-Trifluoromethylphenoxyacetic acid (20 parts by weight) is dissolved in isopropanol (80 parts by weight) to prepare a spray composition. The spray composition is diluted with water to make a solution containing 1,000 p.p.m. of the active ingredient. The solution is admixed with a wetting agent "NITTEN" in an amount of 0.02 to 0.04 percent by weight and sprayed on the foliage of rice plants in a rate of 500 l. per hectare at the stage just before panicle differentiation and stem elongation.

EXAMPLE 2

Sodium m-trifluoromethylphenoxyacetate is dissolved in water to make a solution containing 1,000 p.p.m. of the active ingredient. The solution is admixed with a wetting agent "NITTEN" in an amount of 0.02 to 0.04 percent by weight and sprayed on the foliage of rice plants in a rate of 500 l. per hectare at the stage just before panicle differentiation and stem elongation.

EXAMPLE 3

Dimethylammonium m-trifluoromethylphenoxyacetate (48 parts by weight) is dissolved in water (62 parts by weight) to prepare a spray composition. The spray composition is diluted with water 400 times and, after admixing with a wetting agent "NITTEN" in an amount of 0.02 to 0.04 percent by weight, sprayed on the foliage of Gramineae grasses in a rate of 500 l. per hectare at the rapid growing stage. The spraying is usually repeated 2 to 5 times at intervals of two to three weeks.

EXAMPLE 4

Triethanolammonium m-trifluoromethylphenoxyacetate (1.7 parts by weight) and talc 98.3 parts by weight) are mixed uniformly and pulverized to prepare a dust composition. The dust composition is repeatedly applied by a duster on the foliage of Gramineae grasses at the rapid growing stage.

EXAMPLE 5

Ethyl m-trifluoromethylphenoxyacetate (28 parts by weight), a wetting agent "BC-8048" [a composition consisting of 80 percent by weight of sodium dodecylbenzenesulfonate and 20 percent by weight of inert carriers manufactured by Toho Chemical Industry Co., Ltd.](4 parts by weight) and clay (68 parts by weight) are mixed uniformly and pulverized to prepare a wettable powder composition. The wettable powder composition is diluted with water 400 times and sprayed repeatedly on the foliage of Gramineae grasses at the rapid growing stage.

What is claimed is:

1. A method for controlling the growth in height of Gramineae crop plants which comprise applying a m-trifluoromethylphenoxyacetic acid compound of the formula

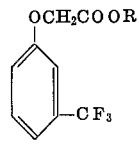

wherein R is a member selected from the group consisting of hydrogen, alkali metal, ammonium, mono(lower)alkylammonium, di(lower)alkylammonium, tri(lower)alkylammonium, mono(lower)alkanolammonium, di(lower)alkanolammonium, tri(lower)alkanolammonium, lower alkyl and lower alkenyl to the plants at a rate sufficient to control the growth in the height of the plants substantially without producing any metamorphosis in the leaves of the plants.

2. The method according to claim 1 wherein the m-trifluoromethylphenoxyacetic acid compound is applied in the form of a mixture with a surface active agent and an inert carrier 3. The method according to claim 1 wherein the plants are rice plants.

4. The method according to claim 1 wherein the m-trifluoromethylphenoxyacetic acid compound is applied to the foliage of rice plants just before panicle differentiation and stem elongation at a rate of 100 to 1,000 g. per hectare of the field where the plants are being cultivated.